(12) United States Patent
Kopish

(10) Patent No.: US 6,848,230 B2
(45) Date of Patent: Feb. 1, 2005

(54) CONNECTION ARRANGEMENT FOR SECURING FRAME MEMBERS TOGETHER IN A WALL SYSTEM

(75) Inventor: Andrew J. Kopish, Green Bay, WI (US)

(73) Assignee: Krueger International, Inc., Green Bay, WI (US)

( * ) Notice: Subject to any disclaimer, the term of this patent is extended or adjusted under 35 U.S.C. 154(b) by 0 days.

(21) Appl. No.: 10/316,693

(22) Filed: Dec. 11, 2002

(65) Prior Publication Data

US 2004/0112000 A1 Jun. 17, 2004

(51) Int. Cl.[7] .................................................. E06B 1/04
(52) U.S. Cl. ...................... 52/656.9; 52/655.1; 403/188
(58) Field of Search ............................ 52/481.1, 481.2, 52/582.1, 655.1, 656.9; 403/187, 188, 280, 382, 403

(56) References Cited

U.S. PATENT DOCUMENTS

| | | | |
|---|---|---|---|
| 3,378,977 A | | 4/1968 | Vervloet |
| 3,561,801 A | * | 2/1971 | Chiu .......................... 403/264 |
| 3,798,863 A | * | 3/1974 | Latson ................... 52/204.597 |
| 3,901,612 A | * | 8/1975 | Canin .......................... 403/189 |
| 4,094,113 A | | 6/1978 | Good |
| 4,689,930 A | | 9/1987 | Menchetti |
| 4,893,958 A | | 1/1990 | Wieland |
| 5,058,347 A | | 10/1991 | Schuelke et al. |
| 5,159,793 A | | 11/1992 | Deugo et al. |
| 5,363,625 A | * | 11/1994 | Philippi ...................... 52/653.2 |
| 5,461,837 A | * | 10/1995 | Chaney et al. ........... 52/204.68 |
| 5,481,842 A | * | 1/1996 | Gautreau ................... 52/656.9 |
| 5,524,402 A | | 6/1996 | Sykes |
| 5,806,261 A | | 9/1998 | Huebner et al. |
| 5,822,935 A | | 10/1998 | Mitchell et al. |
| 5,870,867 A | | 2/1999 | Mitchell |
| 6,052,958 A | | 4/2000 | Miedema et al. |
| 6,125,606 A | * | 10/2000 | Larsson ..................... 52/726.2 |
| 6,141,926 A | | 11/2000 | Rossiter et al. |
| 6,173,545 B1 | | 1/2001 | Feldpausch et al. |
| 6,282,854 B1 | | 9/2001 | Vos et al. |
| 6,390,718 B1 | * | 5/2002 | Steege ......................... 403/187 |

* cited by examiner

*Primary Examiner*—Peter R. Brown
(74) *Attorney, Agent, or Firm*—Boyle, Fredrickson, Newholm, Stein & Gratz, S.C.

(57) ABSTRACT

A connection arrangement for securing first and second members together includes a connector member that engages both the first and second members, and a fastener which interacts with the connector member to simultaneously fix the position of the first member relative to the connector member and to provide frictional engagement of the second member with the connector member. The connector member includes a head portion received within a recess in the first member, and a slidable engagement arrangement for providing slidable engagement of the connector member with the second member. The connector member includes a channel within which an expandable engagement wall of the second member is received. The expandable engagement wall defines a passage, and the fastener extends through aligned openings in the first member and the head portion of the connector member, into the passage defined by the expandable engagement wall of the second member. The fastener functions to move the expandable engagement wall outwardly into engagement with the channel of the connector member as the fastener is advanced into the passage, to establish frictional engagement between the connector member and the second member.

21 Claims, 4 Drawing Sheets

CONNECTION ARRANGEMENT FOR SECURING FRAME MEMBERS TOGETHER IN A WALL SYSTEM

BACKGROUND AND SUMMARY OF THE INVENTION

This invention relates to a system for securing a pair of members together, such as for use in connecting horizontal and vertical members together to construct the frame of a wall system.

A wall system, such as for use in an office environment, typically has a frame constructed of a series of spaced apart vertical members connected together by horizontal members that extend between adjacent vertical members. In a demountable wall system, the horizontal and vertical frame members are connected together via a removable connection arrangement. The horizontal and vertical members are constructed such that the horizontal members can be connected to the vertical members at any location along the length of the vertical members.

In a prior art construction, each horizontal member and each vertical member include a groove along its length. To connect a horizontal member to a vertical member, a short stud is engaged within the groove of the horizontal member and includes an outer end that extends beyond the end of the horizontal member. The stud includes a series of ribs that extend outwardly into engagement with the walls of the groove in the horizontal member. The end of the stud is received within the groove in the vertical member. A hole is formed in the end wall of the groove defined by the vertical member, and a fastener extends through the hole and is received within the passage defined by the stud. While this construction provides a functional connection of a horizontal member to a vertical member, it involves several drawbacks. First, the dimensional tolerances between the stud and the side walls of the groove in the horizontal member must be carefully controlled, to ensure that the stud does not slide axially within the groove in the horizontal member during installation. Secondly, it is possible for the horizontal member to be moved axially relative to the vertical member even after connection of the horizontal and vertical members together, since the frictional engagement between the stud and the side walls of the groove in the horizontal member may not be sufficient to prevent such axial movement of the horizontal member. Thirdly, it is possible for the horizontal member and the stud to separate if the horizontal member is subjected to a vertical force, notwithstanding the presence of ribs formed on the stud which are received within mating recesses formed in the side walls of the groove in the horizontal member. These factors combine to present difficulties in installation as well as potential causes for failure of the connection between the horizontal and vertical members.

It is an object of the present invention to provide a connection arrangement for first and second members, such as horizontal and vertical members in a wall system, that involves a minimal number of steps in installation and a strong and reliable connection between the members. It is a further object of the invention to provide such a connection arrangement which provides a connection that prevents the members from being separated when subjected to either an axial force or a transverse force. Yet another object of the invention is to provide such a connection arrangement which involves a minimum number of parts so as to reduce the overall cost of the system. A still further object of the invention is to provide such a connection arrangement which is relatively simple in its components and construction, and which is capable of use in connection with known types of wall systems and which is installed in a manner somewhat similar to the prior art connection arrangement.

In accordance with the present invention, a connection arrangement for securing first and second members together includes a connector member which is engaged with the first member via first engagement structure that prevents lateral movement between the connector member and the first member, and which is engaged with the second member via second engagement structure that prevents lateral movement between the connector member and the second member. A fastener extends through the first member and into engagement with a passage associated with the second member. The fastener functions to secure the first member and the connector member together, and also functions to establish frictional engagement between the connector member and the second member when the fastener is received within the passage defined by the second member. The frictional engagement between the second member and the connector member functions to prevent axial movement between the second member and the connector member.

The connector member is engaged with the second member adjacent an end defined by the second member, and includes a head portion that extends outwardly beyond the end of the second member. The head portion of the connector member cooperates with a recess, such as a groove, formed in the first member to define the first engagement structure that prevents lateral movement between the connector member and the first member. The connector member further includes slidable engagement structure by which the connector member is slidably engaged with the end of the second member. The slidable engagement structure may be in the form of flange structure associated with the second member, which is received within an open-ended recess defined by the connector member. The head portion of the connector member is preferably configured so as to define a closed end of the open-ended recess, to limit axial movement of the flange structure within the open-ended recess, and to thereby fix the position of the second member relative to the connector member.

The passage of the second member, within which the fastener is received, is preferably defined by an expandable wall associated with the second member. The expandable wall is received within a channel defined by the connector member, and the expandable wall is preferably arcuate in shape and defines a free end. Engagement of the fastener within the passage defined by the expandable wall functions to expand the expandable wall outwardly into engagement with the channel defined by the connector member, to provide frictional engagement between the connector member and the second member.

The invention further contemplates a wall system having frame members that are connected together, as well as a method of connecting first and second members, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
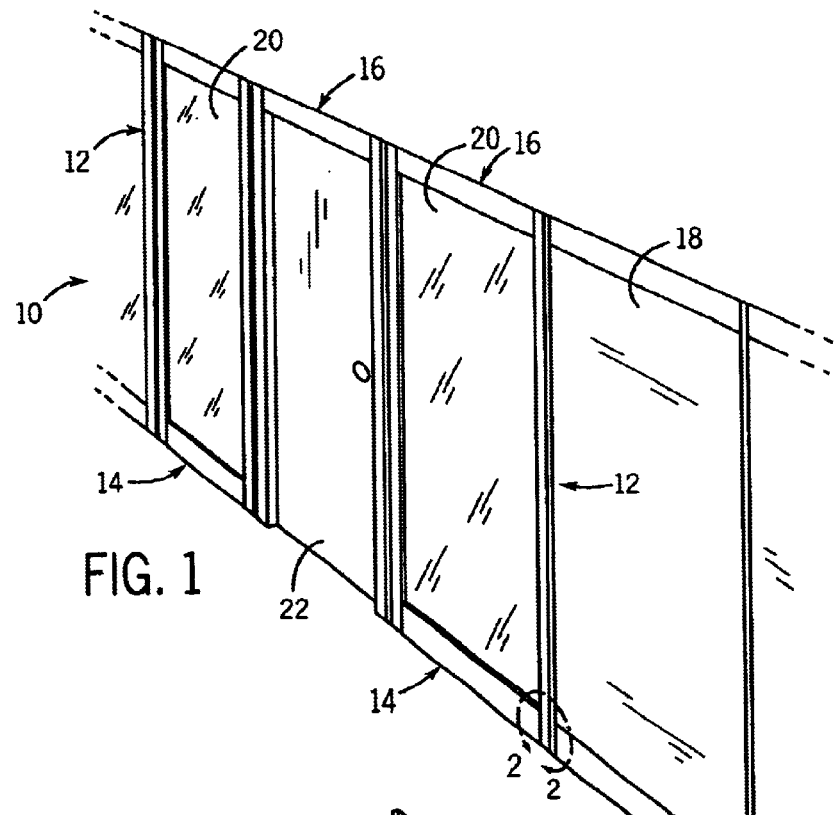
FIG. 1 is a partial isometric view illustrating a frame-type wall system incorporating the connection arrangement of the present invention, such as for connecting horizontal and vertical frame members together.

FIG. 1 illustrates a wall system 10, which includes a frame system constructed of a series of vertical members 12 which are interconnected together via lower horizontal members 14 and upper horizontal members 16. The open areas defined by frame members 12, 14 and 16 may be enclosed by opaque and sound-absorbing wall panels 18, glass panels 20 or other components such as a door 22. Generally, wall system 10 may be of the type that is shown and described in PCT Patent Application No. PCT/CA01/01856 filed Dec. 21, 2001 claiming priority from Canadian Patent Application No. 2,329,591 filed Dec. 22, 2000 and published under PCT Publication No. WO 02/052111 A1, the disclosure of which is hereby incorporated by reference. Wall system 10 has a demountable construction, which enables the various components of wall system 10 to be shipped to an installation site in knocked-down form, and then assembled on site according to a predetermined wall configuration. If desired, the components of wall system 10 can subsequently be disassembled and reconfigured, to provide flexibility in dividing a space.

In wall system 10, vertical members 12 are formed by a pair of vertical sections, one of which is shown at 24 (FIG. 2), which are connected together via a vertical connector to form vertical member 12. Horizontal member 14 may have a groove 26 for use in connecting a wall panel shell 18, or may be configured to receive the edge of a glass panel 20. The particular details of construction of vertical members 12, including vertical sections 24, as well as horizontal members 14, 16 may take any desired form.

Figure 2:
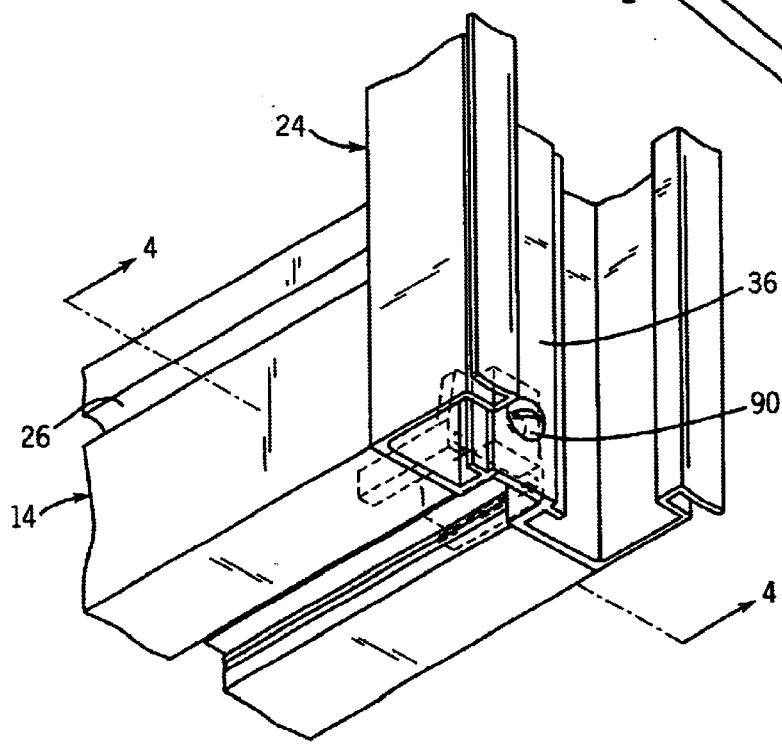
FIG. 2 is a partial isometric view with reference to line 2—2 of FIG. 1, showing a horizontal frame member and a vertical frame member connected together using the connection arrangement of the present invention.
Figure 3:
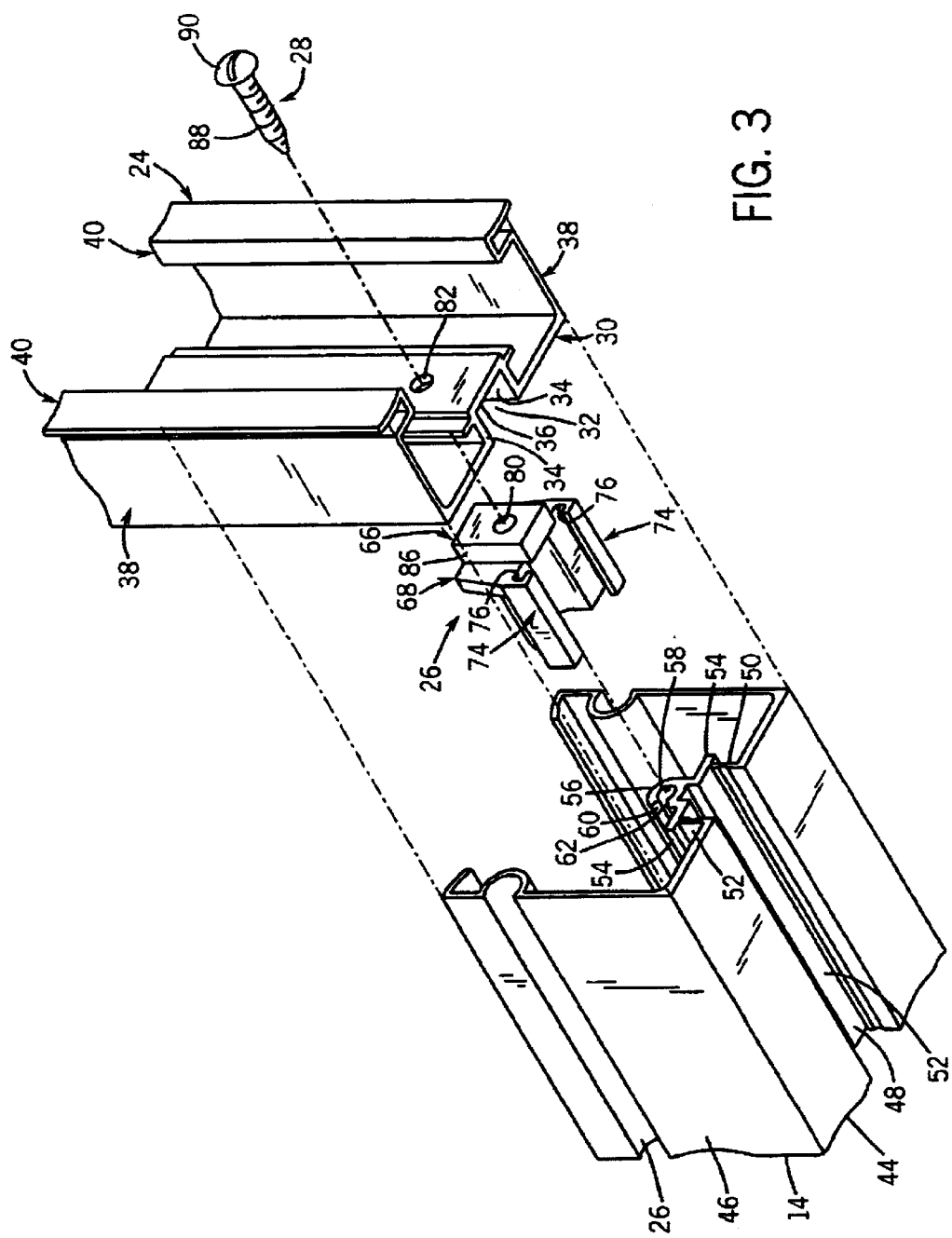
FIG. 3 is an exploded isometric view of the horizontal and vertical members of FIG. 2, and a connector member forming a part of the connection arrangement of the present invention for use in securing the horizontal and vertical members together.

Referring to FIGS. 2 and 3, vertical section 24 and horizontal member 14 are connected together by means of a connector member 26 and a fastener 28. In a manner to be explained, connector member 26 and fastener 28 cooperate to prevent lateral movement between vertical section 24 and horizontal member 14, as well as to prevent axial movement of horizontal member 14 and of vertical section 24.

Figure 4:
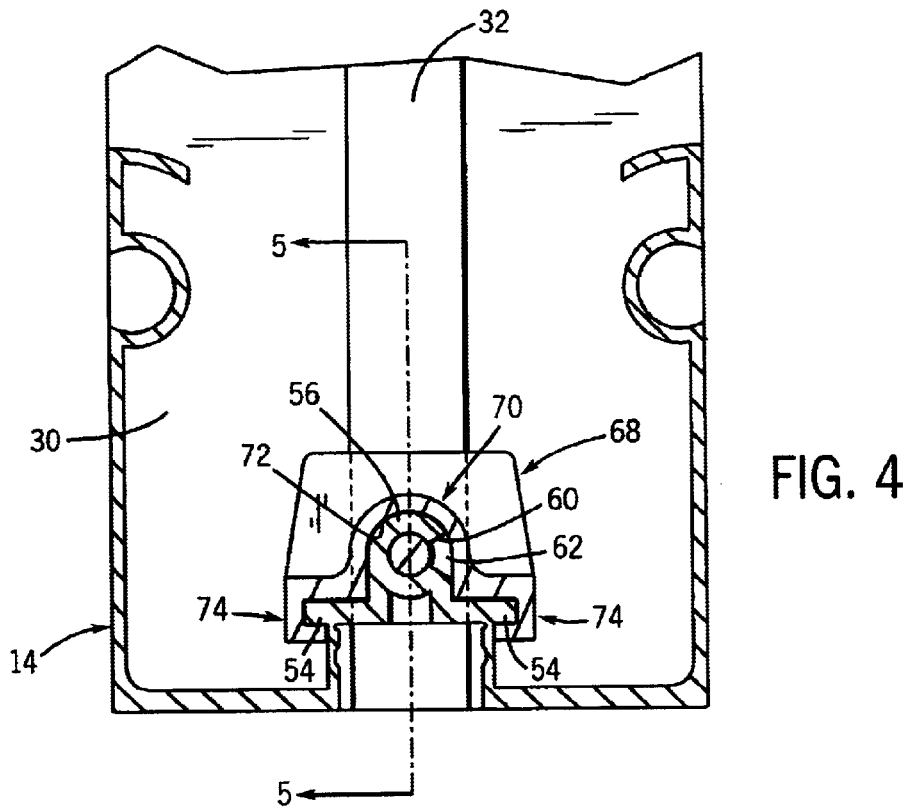
FIG. 4 is a partial section view taken along line 4—4 of FIG. 2.
Figure 5:
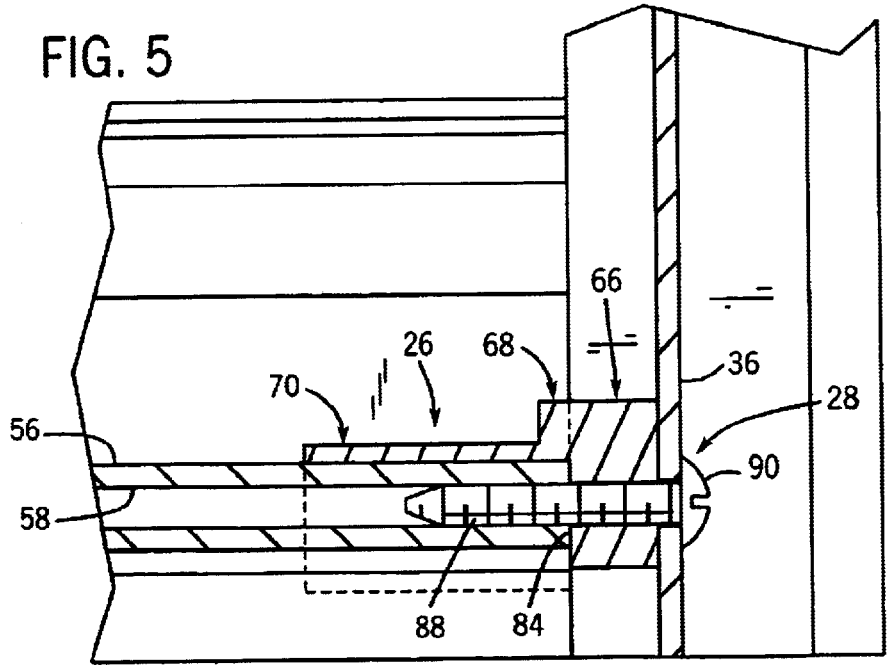
FIG. 5 is a partial section view taken along line 5—5 of FIG. 4.

As shown in FIGS. 3–5, vertical section 24 includes an end wall 30 within which a groove 32 is formed. In the illustrated embodiment, groove 32 extends throughout the length of end wall 30, and is defined by a pair of groove side walls 34 in combination with a groove inner wall 36. In the illustrated embodiment, vertical section 24 is formed in an extrusion process such that groove 32 extends the entire length of vertical section 24.

Vertical section 24 further includes a pair of side walls 38. Each side wall 38 extends from one end of end wall 30, and terminates in a channel 40. A mirror image vertical section 24 is adapted for placement adjacent vertical section 24 as illustrated, such that a pair of channels 40 are positioned in a side-by-side manner. The channels 40 are connected together using a connector strip (not shown) to form a completed vertical member 12.

Horizontal member 14 includes a horizontal end or bottom wall 44 and a pair of upstanding side walls 46 within which grooves 26 are formed. Bottom wall 44 includes a groove 48 defined by a pair of groove side walls 50 and a groove top wall 52. In addition, horizontal member 14 includes engagement structure in the form of a pair of top wall extensions 54 that extend outwardly of groove side walls 50, and an arcuate C-shaped wall 56 that extends upwardly from groove top wall 52. Extensions 54 and groove top wall 52 combine to form an internal flange located within the interior of lower horizontal member 14. C-shaped engagement wall 56 is preferably formed integrally with the internal flange defined by groove top wall 52 and extensions 54, and is configured to form a laterally open passage 58. C-shaped engagement wall 56 defines a pair of ends 60, 62 that are separated from each other by a space in communication with passage 58. In the illustrated embodiment, end 60 of engagement wall 56 is configured as a free end, which is capable of being moved relative to end 62, which is configured as a fixed end of engagement wall 56. In a preferred form, lower horizontal member 14 is formed of a rigid yet malleable material, such as aluminum, in an extrusion process. With this construction, the internal flange defined by groove end wall 52 and extensions 54 has a rigid construction, as does engagement wall 56. The material of lower horizontal member 14 is sufficiently malleable to enable engagement wall 56 to be slightly flexed without yielding, for reasons to be explained.

Connector member 26 defines a head portion 66 that extends from a shoulder portion 68. A U-shaped channel 70 extends from shoulder portion 68 in a direction opposite that of head portion 66. Channel 70 defines a rearwardly open internal cavity 72, which has a shape corresponding to that of C-shaped engagement wall 56. A pair of rearwardly open receivers 74 are located on opposite sides of channel 70, and define facing trough areas 76 formed by inwardly extending lips 78, which are configured to receive extensions 54. Head portion 66 of connector member 26 has an opening 80 that extends through head portion 66 and is in communication with cavity 74 defined by channel 70.

In operation and assembly, vertical section 24 and lower horizontal member 14 are connected together using connector 26 as follows. First, the desired position of horizontal member 14 relative to vertical section 24 is determined, and an opening 82 is formed in groove inner wall 36 of vertical section 24 in a location that ultimately provides the desired elevation of horizontal member 14. Opening 82 may be formed during initial manufacture of vertical section 12 in the event the position of horizontal member 14 relative to vertical section 24 is known. Alternatively, opening 82 may be formed on-site during installation, in the event the exact desired location of opening 82 is not known beforehand. Connector 26 is then slidably engaged with horizontal member 14 by positioning extensions 54 within trough areas 76 and positioning C-shaped engagement wall 56 within cavity 72 defined by channel 70. The end of C-shaped engagement wall 56 engages a rearwardly facing surface 84 defined by head portion 66, which acts as a stop surface to fix the axial position of connector 26 relative to horizontal member 14.

With connector 26 engaged with horizontal member 14 in this manner, horizontal member 14 and vertical section 24 are moved together so that head portion 66 is received within groove 32 of vertical section 24. The width of connector head portion 66 corresponds to the spacing between groove side walls 34, such that engagement of side surfaces 86 defined by head portion 66 prevents lateral movement between connector 26 and vertical section 24, and thereby lateral movement of horizontal member 14 relative to vertical section 24. Horizontal member 14 and connector 26 are positioned such that opening 80 in head portion 66 is aligned with opening 82 in groove inner wall 36 of vertical section 24. When connector 26 is engaged within groove 32 in this manner, the surface of shoulder portion 68 engages end wall 30 of vertical section 24 adjacent groove 32.

Fastener 28 is then inserted through aligned openings 82 and 80, such that the threaded shank of fastener 28, shown at 88, is received within passage 58 defined by C-shaped engagement wall 56. The threads of fastener shank 88 are self-tapping, to enable engagement of fastener shank 88 with the internal surface of engagement wall 56 that defines passage 58. Fastener 28 is advanced to a position in which the head of fastener 28, shown at 90, is moved into engagement with the inner surface defined by groove inner wall 36 of vertical section 24.

Shank 88 of fastener 28 is dimension such that engagement of shank 88 within passage 58 causes expansion of passage 58 by outward movement of C-shaped engagement wall 56, which is enabled by free end 60 of engagement wall 56. Such outward movement of C-shaped engagement wall 56 causes frictional engagement between the facing surfaces of engagement wall 56 and channel 70. The engagement of extensions 54 within trough areas 70 defined by connector receivers 74 resists relative movement between connector 26 and horizontal member 14, to create the frictional engagement of C-shaped engagement wall 56 with channel 70. In this manner, connector 26 and fastener 28 function to fix horizontal member 14 and vertical section 24 together, in a manner that prevents lateral and axial movement between horizontal member 14 and vertical section 24. In the event it is desired to disassemble horizontal member 14 and vertical section 24, fastener 28 is removed so as to relieve the outward pressure applied to engagement wall 56, which enables horizontal member 14, vertical section 24 and connector 26 to be separated. The same components can then be subsequently connected together or connected to other components in different configurations as desired, in the same manner as described previously.

Figure 6:
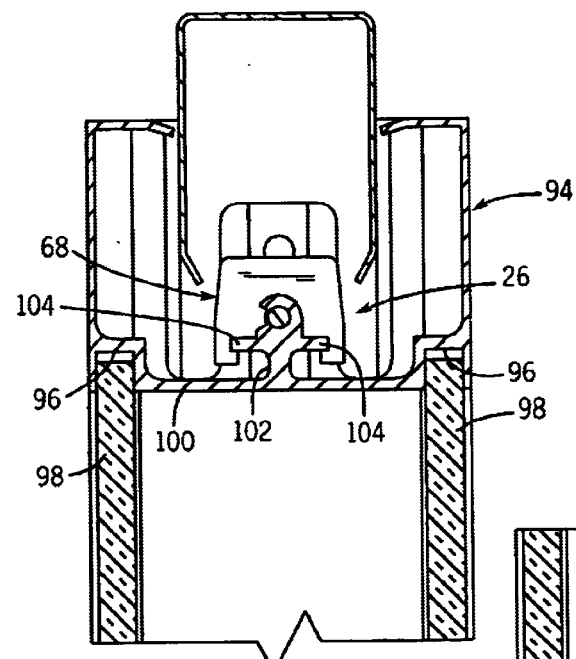
FIGS. 6 and 7 are section views similar to FIG. 4, showing alternative constructions for the horizontal and vertical members interconnected together using the connection arrangement of the present invention.
Figure 7:
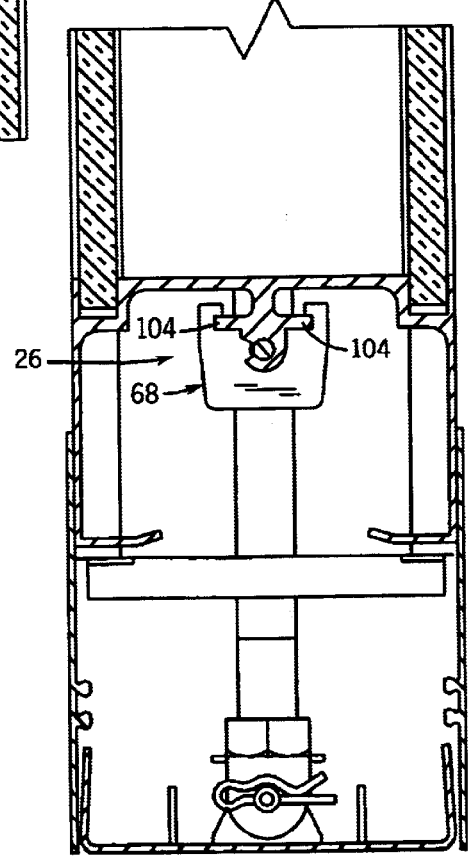

FIGS. 6 and 7 show use of connector 26 with a differently configured horizontal member, shown at 94, which is shown as an upper horizontal member in FIG. 6 and as a lower horizontal member in FIG. 7. Horizontal member 94 includes a pair of outer grooves 96 for mounting glass panels 98, and a transverse wall 100 extends between grooves 96. In this embodiment, a web 102 extends outwardly from transverse wall 100, and flanges 104 extend outwardly in opposite directions from web 102. A C-shaped engagement wall, shown at 56', extends from flanges 104. Flanges 104 perform the same function as extensions 54 in the embodiment of FIGS. 1–5, in that flanges 104 are slidably received within trough areas 76 and engage connector 26 when fastener 28 is received within passage 58 defined by C-shaped engagement wall 56, to establish frictional engagement between engagement wall 56 and channel 70 of connector member 26.

While the invention has been shown and described with respect to a specific embodiment, it is understood that various alterations and modifications are possible and are contemplated as being within the scope of the present invention. For example, and without limitation, while groove 32 in vertical section 24 is shown as extending the full length of vertical section 24, it is also possible to use an isolated recess for receiving head portion 66 of connector member 26 at any desired location along the length of the vertical member. The provision of a groove such as 32, however, enables connector member 26 to be secured to the vertical member at any location along the length of the vertical member. Further, it is also possible for the vertical member to have a protrusion in place of a recess or groove, and for the connector member to have a recess within which the protrusion is received, rather than a protruding head portion 66 as shown. In addition, while connector member 26 is shown as having trough areas 70 within which the extensions 54 or flanges 104 are received, it is also possible for the horizontal member to have spaced apart recesses and for connector member 26 to have flanges or tabs that are received within the recesses, so as to provide a reverse construction from the illustrated embodiments. In addition, it is also contemplated that the shape of channel 70 and C-shaped engagement wall 56 may vary from the illustrated configuration, and to have a different mating configuration which nonetheless allows expansion of the engagement wall into frictional engagement with the channel surface when the fastener is engaged within the passage defined by the engagement wall.

Various alternatives and embodiments are contemplated as being within the scope of the following claims particularly pointing out and distinctly claiming the subject matter regarded as the invention.

I claim:

1. A connection arrangement for securing first and second members together, comprising:

a connector member separate from the first and second members, wherein the connector member and the first member include first engagement structure for preventing lateral movement between the connector member and the first member, and wherein the connector member and the second member include second engagement structure for engaging the connector member with the second member adjacent an end defined by the second member, wherein the second engagement structure prevents lateral movement between the connector member and the second member;

an opening in the first member;

a receiver defined by the second member, wherein the receiver includes a passage defined at least in part by expandable wall structure, and wherein the connector member includes an engagement surface adjacent the expandable wall structure;

a fastener including a head and a shank, wherein the shank of the fastener extends through the opening in the first member into engagement within the passage defined by the receiver, wherein the head of the fastener is sized and configured so as to engage the first member adjacent the opening such that the head of the fastener does not pass through the opening, wherein the fastener is configured to fix the axial position of the connector member relative to the first member, and wherein engagement of the fastener shank within the receiver passage expands the expandable wall structure of the receiver outwardly to establish frictional engagement of the expandable wall structure of the receiver with the engagement surface of the connector member so as to prevent axial movement of the connector member relative to the second member, and thereby to fix the position of the second member relative to the first member.

2. The connection arrangement of claim 1, wherein the first engagement structure comprises a recess formed in the first member and a head portion defined by the connector member adapted to be received within the recess, wherein the recess and the head portion are configured to prevent lateral movement of the connector member relative to the first member.

3. The connection arrangement of claim 2, wherein the recess comprises a groove formed in the first member, wherein the head portion of the connector member is adapted to be positioned along the groove so as to enable the second member to be secured to the first member at any location along the length of the groove.

4. The connection arrangement of claim 3, wherein the groove defines a pair of spaced apart walls and wherein the head portion of the connector member defines a pair of engagement surfaces configured to engage the spaced apart walls of the groove to prevent lateral movement of the connector member relative to the first member.

5. The connection arrangement of claim 4, wherein the head portion of the connector member extends from a shoulder area defined by the connector member, wherein the shoulder area of the connector member engages the first member adjacent the groove so as to fix the axial position of the connector member relative to the first member.

6. The connection arrangement of claim 5, wherein the second engagement structure comprises a slidable engagement arrangement associated with the connector member and the second member.

7. The connection arrangement of claim 6, wherein the slidable engagement arrangement comprises an open-ended recess extending from the shoulder area of the connector member, and slidable engagement structure formed on the second member configured to be slidably received within the open-ended recess of the connector member.

8. The connection arrangement of claim 2, wherein expandable wall structure of the receiver is received within a channel defined by the connector member, wherein the channel includes the engagement surface, and wherein engagement of the fastener within the receiver passage is operable to expand the expandable wall structure of the receiver outwardly into frictional engagement with the engagement surface of the channel to connect the second member and the connector member together.

9. The connection arrangement of claim 8, wherein the second engagement structure comprises an open-ended recess associated with one of the connector member and the second member, and slidable engagement structure associated with the other of the connector member and the second member adapted for slidable engagement within the recess.

10. The connection arrangement of claim 9, wherein the recess is formed in the connector member and extends from the head portion, and wherein the slidable engagement structure comprises a flange arrangement associated with the second member and configured for slidable engagement within the recess, wherein the expandable wall structure of the receiver is interconnected with the flange arrangement.

11. A method of connecting first and second members together, comprising the steps of:
 engaging a connector member with the first member in a manner that prevents lateral movement between the connector member and the first member;
 engaging the connector member with an end defined by the second member in a manner that prevents lateral movement between the connector member and the second member; and
 engaging the shank of a fastener through an opening in the first member into engagement within a passage defined at least in part by an expandable wall associated with the second member, wherein the expandable wall is located adjacent an engagement surface associated with the connector member, wherein the fastener includes a head, and wherein the fastener head and the opening in the first member are configured such that the fastener head engages the first member adjacent the opening to prevent the fastener head from passing through the opening to fix the axial position of the connector member relative to the first member, and wherein engagement of the fastener shank within the passage defined by the expandable wall functions to expand the expandable wall outwardly into functional engagement with the engagement surface of the connector member to prevent axial movement between the connector member and the second member, to thereby prevent axial movement of the first member and the second member to secure the first and second members together.

12. The method of claim 11, wherein the step of engaging the connector member with the first member is carried out by positioning a head portion defined by the connector member within a groove defined by the first member.

13. The method of claim 11, wherein the step of engaging the connector member with an end defined by the second member is carried out by slidably engaging flange structure defined by the second member within an open-ended recess defined by the connector member.

14. The method of claim 13, wherein the connector member further includes a head portion configured to engage the flange structure of the second member to limit axial movement of the connector member relative to the second member, and wherein the step of engaging the connector member with the first member is carried out by engaging the head portion of the connector member within a recess defined by the first member.

15. The method of claim 11, wherein the expandable wall of the second member is received within a channel defined by the connector member that defines the engagement surface, wherein the step of engaging the shank of the fastener within the passage defined by the expandable wall functions to deflect the expandable wall of the second member outwardly into frictional engagement with the channel.

16. The method of claim 15, wherein the expandable wall of the second member comprises an arcuate wall having a free end, wherein the arcuate wall defines the passage within which the fastener is received, and wherein the step of engaging the shank of the fastener within the passage defined by the expandable wall functions to move the free end of the expandable wall outwardly into engagement with the channel.

17. A wall frame, comprising:
 a first member having a recess and an opening that opens into the recess;
 a second member adapted to be positioned adjacent the first member;
 a connector member interposed between the first member and the second member, wherein the connector member includes a head portion configured for engagement within the recess, and wherein the connector member and the second member include complementary slidable engagement structure for providing slidable engagement between the second member and the connector member;

wherein the second member includes expandable wall structure defining a passage and wherein the connector member includes an engagement section within which the wall structure is received, wherein the engagement section defines an engagement surface; and a fastener having a shank that extends through the opening of the first member and into engagement with the passage defined by the expandable wall structure, wherein engagement of the fastener shank within the passage is operable to expand the expandable wall structure into frictional engagement with the engagement surface of the connector, and wherein the fastener includes a head that is configured to engage the first member adjacent the opening to prevent the head from passing through the opening, and wherein engagement of the fastener shank within the passage and the fastener head with the first member functions to fix the axial position of the second member relative to the first member and to prevent axial movement between the connector and the second member, to thereby fix the first and second members together.

18. The wall frame of claim 17, wherein the connector member engagement section comprises a channel within which the expandable wall structure of the second member is received and which defines the engagement surface, and wherein the complementary slidable engagement structure of the connector member and the second member is operable to fix the position of the connector member relative to the second member so as to enable expansion of the expandable wall structure when the fastener is engaged within the passage defined by the expandable wall structure.

19. The wall frame of claim 17, wherein the head portion of the connector member extends from a shoulder area, wherein the shoulder area engages the first member adjacent the recess in the first member when the head portion of the connector member is engaged within the recess.

20. A wall frame, comprising:

a first member having a recess;

a second member adapted to be positioned adjacent the first member;

a connector member interposed between the first member and the second member, wherein the connector member includes a head portion adapted for engagement within the recess, and wherein the connector member and the second member include complementary slidable engagement structure for providing slidable engagement between the second member and the connector member;

wherein the second member includes expandable wall structure defining a passage and wherein the connector member includes a channel within which the expandable wall structure of the second member is received;

a fastener that extends through the first member and the head portion of the connector member into engagement with the passage, wherein engagement of the fastener within the passage is operable to expand the expandable wall structure into frictional engagement with the receiver of the connector to prevent axial movement between the connector and the second member to thereby fix the first and second members together;

wherein time complementary slidable engagement structure of the connector member and the second member is operable to fix the position of the connector member relative to the second member so as to enable expansion of the expandable wall structure when the fastener is engaged within the passage defined by the expandable wall structure;

wherein the complementary slidable engagement structure comprises a pair of axially extending engagement members associated with the second member, and a pair of spaced apart trough areas within which the engagement members are received, wherein engagement of the engagement members within the trough areas fixes the position of the connector member relative to the second member so as to enable expansion of the expandable wall structure when the fastener is received within the passage defined by the expandable wall structure.

21. A structural arrangement, comprising:

a first member including an opening;

a second member having a portion adapted for engagement with the first member and including an expandable wall that defines a passage; and connection means for securing the first and second members together, wherein the connection means includes a connector member and first engagement means interposed between the first member and the connector member for preventing lateral movement of the connector member relative to the first member, second engagement means for engagement with the second member so as to prevent lateral movement between the second member and the connector member, and frictional engagement means extending between the first member and the second member for fixing the axial position of the connector member relative to the first member and for simultaneously providing frictional engagement between the second member and the connector member for preventing axial movement of the second member relative to the first member, wherein the frictional engagement means includes fastener means having a head and a shank, wherein the shank extends through the opening in the first member into engagement with a passage defined by expandable wall means associated with the second member, and wherein the head of the fastener means is configured so as to engage the first member adjacent the opening to prevent the head of the fastener means from passing through the opening, and wherein the connector member includes an engagement surface located adjacent the expandable wall means, and wherein engagement of the shank of the fastener means within the passage defined by the expandable wall structure is operable to expand the expandable wall structure outwardly into engagement with the engagement surface.

* * * * *

UNITED STATES PATENT AND TRADEMARK OFFICE
CERTIFICATE OF CORRECTION

PATENT NO. : 6,848,230 B2
DATED : February 1, 2005
INVENTOR(S) : Andrew J. Kopish It is certified that error appears in the above-identified patent and that said Letters Patent is hereby corrected as shown below:

Column 7,
Line 40, after "wherein" insert -- the --;

Column 10,
Line 4, delete "time" and substitute therefore -- the --.

Signed and Sealed this

Fifth Day of July, 2005

JON W. DUDAS
*Director of the United States Patent and Trademark Office*